(12) United States Patent
Green

(10) Patent No.: US 7,402,829 B2
(45) Date of Patent: Jul. 22, 2008

(54) STRUCTURED SILICON ANODE

(75) Inventor: Mino Green, London (GB)

(73) Assignee: Nexeon Ltd., Oxford (GB)

( * ) Notice: Subject to any disclaimer, the term of this patent is extended or adjusted under 35 U.S.C. 154(b) by 170 days.

(21) Appl. No.: 10/533,822

(22) PCT Filed: Nov. 5, 2003

(86) PCT No.: PCT/GB03/04783

§ 371 (c)(1),
(2), (4) Date: Aug. 31, 2005

(87) PCT Pub. No.: WO2004/042851

PCT Pub. Date: May 21, 2004

(65) Prior Publication Data

US 2006/0097691 A1    May 11, 2006

(30) Foreign Application Priority Data

Nov. 5, 2002    (GB) ................................. 0225779.8

(51) Int. Cl.
*H01L 29/00* (2006.01)
(52) U.S. Cl. ........................ 257/1; 257/2; 257/3; 257/4; 257/5; 320/107; 324/252; 977/948; 977/932; 977/810; 977/701
(58) Field of Classification Search .................. 257/1–5; 438/809, 900; 320/107; 429/52
See application file for complete search history.

(56) References Cited

U.S. PATENT DOCUMENTS

| 5,262,021 | A | 11/1993 | Lehmann et al. |
| 5,907,899 | A | 6/1999 | Dahn et al. |
| 6,022,640 | A | 2/2000 | Takada et al. |
| 6,042,969 | A | 3/2000 | Yamada et al. |
| 6,334,939 | B1 | 1/2002 | Zhou et al. |
| 6,337,156 | B1 | 1/2002 | Narang et al. |
| 6,353,317 | B1 * | 3/2002 | Green et al. ................. 324/252 |
| 2004/0072067 | A1 | 4/2004 | Minami et al. |

FOREIGN PATENT DOCUMENTS

| EP | 0 820 110 | 1/1998 |
| EP | 1 011 160 | 6/2000 |
| EP | 1 258 937 | 11/2002 |

(Continued)

OTHER PUBLICATIONS

S. Tsuchiya et al., ("Structural Fabrication Using Cesium Chloride Island Arrays as a Resist in a Fluorocarbon Reactive Ion Etching Plasma", Electrochemical Solid-State Letters, vol. 3, issue 1, pp. 44-46, 2000; publicly available electronically Nov. 5, 1999).*

(Continued)

*Primary Examiner*—Jerome Jackson
*Assistant Examiner*—Jami M Valentine
(74) *Attorney, Agent, or Firm*—Fay Sharpe LLP

(57) ABSTRACT

A silicon/lithium battery can be fabricated from a silicon substrate. This allows the battery to be produced as an integrated unit on a chip. The battery includes a silicon anode formed from sub-micron diameter pillars of silicon fabricated on an n-type silicon wafer. The battery also includes a cathode including lithium.

15 Claims, 11 Drawing Sheets

FOREIGN PATENT DOCUMENTS

| EP | 1 335 438 | 8/2003 |
|---|---|---|
| JP | 10-83817 | 3/1998 |
| JP | 10-199524 | 7/1998 |
| JP | 2001-291514 | 10/2001 |
| JP | 2002-313319 | 10/2002 |
| JP | 2004-296386 | 10/2004 |
| NL | 1015956 | 2/2002 |
| WO | WO 99/33129 | 7/1999 |
| WO | WO 01/13414 | 2/2001 |
| WO | WO 2004/042851 | 5/2004 |

OTHER PUBLICATIONS

R. A. Sharma et al., "Thermodynamic Properties of the Lithium-Silicon System", J. Electrochem. Soc., 123, pp. 1763-1768 (1976).

B.A. Boukamp et al., "All-Solid Lithium Electrodes with Mixed-Conductor Matrix", J. Electrochem. Soc., 128, pp. 725-729 (1981).

R. A. Huggins, "Lithium Alloy Anodes" in Handbook of Battery Materials, J.O. Besenhard Ed., Wiley-VCH, Weinheim, pp. 359-381 (1999).

S. Bourderau, et al., "Amorphous Silicon as a Possible Anode Material for Li-ion Batteries", J. Power Sources, pp. 233-290, 81 (1999).

Hong Li et al., "A High Capacity Nano-Si Composite Anode Material for Lithium Rechargeable Batteries", Electrochem. Solid-State Lett., 2, pp. 547-549 (1999).

J.O. Besenhard et al., "Will Advanced Lithium-Alloy Anodes Have a Chance in Lithium-ion Batteries?", J. Power Source, 68, pp. 87-90 (1997).

L.Y. Beaulieu et al., "Reaction of Li with Grain-Boundary Atoms in Nanostructured Compounds", J. Electrochem. Soc., 147, pp. 3206-3212 (2000).

J. K. Niparko (Editor), "Cochlear Implants Technology", Pub., Lippincott Williams and Wilkins, Philadelphia, pp. 109-121 (2000).

C.J. Wen et al., "Chemical Diffusion in Intermediate Phases in the Lithium-Silicon System", J. Solid State Chem., 37, pp. 271-278 (1981).

W.J. Weydanz et al., "A Room Temperature Study of the Binary Lithium-Silicon and the Ternary Lithium-Chromium-Silicon System for use in Rechargeable Lithium Batteries", J. Power Sources, 81-82, pp. 237-242 (1999).

J-P. Colinge, "Silicon-on-Insulator Technology: Materials to VLSI", Kluwer Acad. Pub, Boston, Chapter 2, p. 38 (1991).

Mino Green, "Quantum Pillar Structures on $n^+$ Gallium Arsenide Fabricated Using 'Natural' Lithography", Appl. Phys. Lett., 63, pp. 264-266 (1993).

Mino Green et al., "Mesoscopic Hemisphere Arrays for Use as Resist in Solid State Structure Fabrication", J. Vac. Sci. & Tech. B, 17, pp. 2074-2083 (1999).

Shin Tsuchiya et al., "Structural Fabrication Using Cesium Chloride Island Arrays as a Resist in a Fluorocarbon Reactive Ion Etching Plasma", Electrochem. Solid-State Lett., 3, pp. 44-46 (2000).

L-C. Chen et al., "Selective Etching of Silicon in Aqueous Ammonia Solution", Sensors and Actuators, A49, pp. 115-121 (1995).

H. Li et al., "The Crystal Structural Evolution of Nano-Si Anode Caused by Lithium Insertion and Extraction at Room Temperature", Solid State Ionics, 135, pp. 181-191 (2000).

"Properties of Silicon", Pub. INSPEC, The Institution of Electrical Engineers, London (1988): p. 461 for solubility; p. 455 for diffusion data.

B.E. Deal et al., "General Relationship for the Thermal Oxidation of Silicon", J. Appl. Phys., 36, pp. 3770-3778.

L.Y. Beaulieu et al., "Colossal Reversible Volume Changes in Lithium Alloys", Electrochem. Solid State Lett., 4, pp. A137-A140 (2001).

Ohara et al, "A thin film silicon . . . ", J. Power Sources 136 (2004), pp. 303-306.

J.P. Maranchi et al, Interfacial properties of the . . . , J. Electrochem. Soc. 153(6) A1246, 2006.

M. Green et al, "Structured Silicon Anodes for . . . ", Electrochem and solid-state Letters 6, A75-79, 2003.

W.-R. Liu et al. Effect of electrode structure on performance of Si anode in Li-ion batteries: Si particle size and conductive additive Journal of Power Sources 140 (2005) 139-144.

Y. Liu et al. A novel method of fabricating porous silicon material: ultrasonically enhanced anodic electrochemical etching. Solid State Communications 127 (2003) 583-588.

W. Lang. Silicon Micromachining Technology. Materials Science and Engineering R17 (1996) 1-55.

T. Qiu et al, From Si nanotubes to nanowires: Synthesis, characterization, and self-assembly, Journal of Crystal Growth 277 (2005) 143-148.

K. W. Kolasinski, Silicon nanostructures from electroless electrochemical etching, Current Opinion in Solid Sate and Materials Science 9 (2005) 73-83.

X. Badel et al. Formation of ordered pore arrays at the nanoscale by electrochemical etching of n-type silicon. Superlattices and Microstructures 36 (2004) 245-253.

P. Kleimann et al. Formation of wide and deep pores in silicon by electrochemical etching. Materials Science and Engineering B69-70 (2000) 29-33.

H.-C. Shin et al. Porous silicon negative electrodes for rechargeable lithium batteries, Journal of Power Sources 139 (2005) 314-320.

K. Tokoro, D. Uchikawa, M. Shikida, and K. Sato. Anisotropic Etching Properties of Silicon in KOH and TMAH Solutions. Proceedings of the 1998 International Symposium on Micromechantronics and Human Science, 1998. MHS '98. Nov. 25-28, 1998 pp. 65-70.

S-H Kim, S-H Lee, H-T Lim, Y-K Kim, S-K Lee. (110) silicon etching for high aspect ratio comb structures 1997 6th International Conference on Emerging Technologies and Factory Automation Proceedings, 1999. ETFA '97., Sep. 9-12, 1997 pp. 248-252.

T. Nakahata, H. Nakajima, "Fabrication of lotus-type porous silicon by unidirectional solidification in hydrogen", Materials Science and Engineering A 384 (2004) 373-376.

Jyh-Woei Lu et al., "A study of the mechanisms of erosion in silicon single crystals using Hertzian fracture tests", Wear 186-187 (1995) 105-116.

J. B. Chang et al, "Ultrafast growth of single-crystalline Si nanowires", Materials Letters 60 (2006) 2125-2128.

R. Wagner, W. Ellis. "Vapor-liquid solid mechanism of single crystal growth", Applied Physics Letters vol. 4, No. 5 Mar. 1964, 89-90.

X. Q. Yan et al., "$H_2$-assisted control growth . . . ", / Journal of Crystal Growth 257 (2003) 69-74.

Y. Zhang et al., "Synthesis of thin Si whiskers . . . ", Journal of Crystal Growth 186 226 (2001) 185-191.

Y. F. Zhang et al. Bulk-quantity Si nanowires synthesized by SiO sublimation. Journal of Crystal Growth 212 (2000) 115-118.

Z. Jianfeng, Large-scale array of highly oriented silicon-rich micro/nanowires induced by gas flow steering, Solid State Communications 133 (2005) 271-275.

L. Z. Pei et al, Silicon nanowires grown from silicon monoxide under hydrothermal conditions, Journal of Crystal Growth 289 (2006) 423-427.

H.F. Yan et al., "Growth of amorphous silicon . . . ", Chemical Physics Letters 323 (2000) 224-228.

Y.Y. Wong et al., "Controlled growth of silicon . . . ", Science and Technology of Advanced Materials 6 (2005) 330-4.

Z.Y. Zhang et al. Catalytic growth of a-FeSi2 and silicon nanowires. Journal of Crystal Growth 289 288 (2005) 286-291.

J.W. Kim et al. Improvement of silicon powder negative electrodes by copper electroless deposition for lithium secondary batteries. Journal of Power Sources 147 (2005) 227-233.

M. Yoshio et al. Electrochemical behaviors of silicon based anode material. Journal of Power Sources 153 (2006) 375-379.

\* cited by examiner

STRUCTURED SILICON ANODE

The present invention relates to structured silicon anodes for lithium battery applications.

Silicon is recognised as a potentially high energy per unit volume host material for lithium in lithium battery applications[1]. Attempts at realising this potential have met with only partial success when nano-composites of silicon powder and carbon black have been used[2]. The major technical problem associated with the use of silicon/lithium appears to be the mechanical failure brought about by the repeated large volume expansion associated with alloying[1c,3]. Metallic and intermetallic anodic host materials, other than layer materials such as graphite, are reported to disintegrate after a few lithium insertion/extraction cycles[3,4] unless in fine powder form (sub-micron range). Since we are interested in finding a way to make a lithium battery integrated onto a silicon chip we need to find a solution to this materials problem. It is envisaged that the principal applications area for lithium batteries integrated into a chip would be in the medical field. Thus the well-developed practice of cochlea implants appears to be an area that would benefit from an integrated battery supply[5].

This invention seeks to realise the potential of the silicon-lithium system to allow the possibility of a lithium battery integrated on to a silicon chip.

Accordingly this invention provides a method of fabricating sub-micron silicon electrode structures on a silicon wafer. Preferably these structures comprise pillars.

For a silicon-lithium system the basic cell diagram can be represented as Li|Li$^+$-electrolyte|Si, for this cell the cathodic process is, discharge of lithium onto silicon to form an alloy (charging), and the anodic process is lithium extraction or de-alloying (discharging). The EMF data reported by Wen and Huggins[6] for the liquid system at 415° C. is shown bracketed below and the solid system at room temperature[7] is shown un-bracketed below. Their results (in mV vs, Li) are: Si/Li$_{12}$Si$_7$-582(332); Li$_{12}$Si$_7$/Li$_7$Si$_3$-520(288); Li$_7$Si$_3$/Li$_{13}$Si$_4$-428 (158); Li$_{13}$Si$_4$/Li$_{21}$Si$_5$-~300 (44).

It will be appreciated that the formation of Li$_{12}$Si$_7$ in place of Si results in a significant volume change (the alloy is 2.17 times bigger). On a conventional silicon wafer suitable for use as an anode for a lithium battery this volume change leads to crack formation and pulverisation however due to their small size and configuration sub-micron anode structures made in accordance with the invention, are be able to tolerate the conditions occasioned by the massive volume changes occasioned by lithium alloying/de-alloying. In tests structured electrodes of sub micron diameter Si pillars maintained their structural integrity throughout the cycling whereas planar Si electrodes showed cracks (2 micron features) after 50 cycles. An appropriate size restriction to achieve suitable electrodes is that the silicon pillars should not exceed a fractional surface coverage (F) of ~0.5.

An embodiment of the invention will now be described by way of non-limiting example only, with reference to the accompanying drawings, in which.

The electrochemical discharge of lithium on silicon and its subsequent chemical reaction destroys the silicon lattice, giving rise to the swelling of the solid, producing amorphous Si/Li phases[13]. The first new phase to appear in the system is Li$_{12}$Si$_7$. This compound, and all the rest up to Li, is a so-called Zintl-Phase Compound (ZPC), and consists of simple, electropositive, cations and complex co-valently bound, multiply charged, electronegative, anions. Of course the charge ascribed to the "ions" is purely notional: the actual charge (depending upon definition) is less than the formal value and may be considerably less, hence the bulk lithium will be referred to as Li° and bulk silicon as Si$_n$°.

It is important to form some idea of the mechanism of lithiation and de-lithiation of silicon. It is proposed that:

(i) Discharged lithium reacts with silicon forming a ZPC film with atomically continuous contact to the silicon.

(ii) Lithium excess diffuses (via a vacancy mechanism) through the compact ZPC film to react with silicon at the Si/ZPC interface, thickening the ZPC film, without void formation.

These processes might be represented by: Li$^+$(el)+e$^-$ (solid)→Li(ads.); Li(ads.)+V(ZPC)→Li° (ZPC)$_s$; Li° (ZPC)$_s$→diffusion→Li° (ZPC)$_{ZPC/Si}$;×Li°+ySi°→ZPC (Li$_{x/y}$Si).

(Li(ads) is Li adsorbed on ZPC; V is a Li° vacancy in ZPC)

(iii) The amorphous[13] ZPC film is deformable and so does not give rise to significant stress induced cracking on volume change.

The diffusion coefficient, D, for Li in crystalline Si[14] is ~10$^{-14}$ cm$^2$ s$^{-1}$, Li in ZPC is expected to be faster; a value of D 10$^{-12}$ cm$^2$ s$^{-1}$ would be enough to account for all the processes carried out in this study. This model for ZPC film formation is in many ways analogous to the model of SiO$_2$ layer formation on silicon due to Deal and Grove[15]: but the details are different and will be treated elsewhere.

Figure 4A:
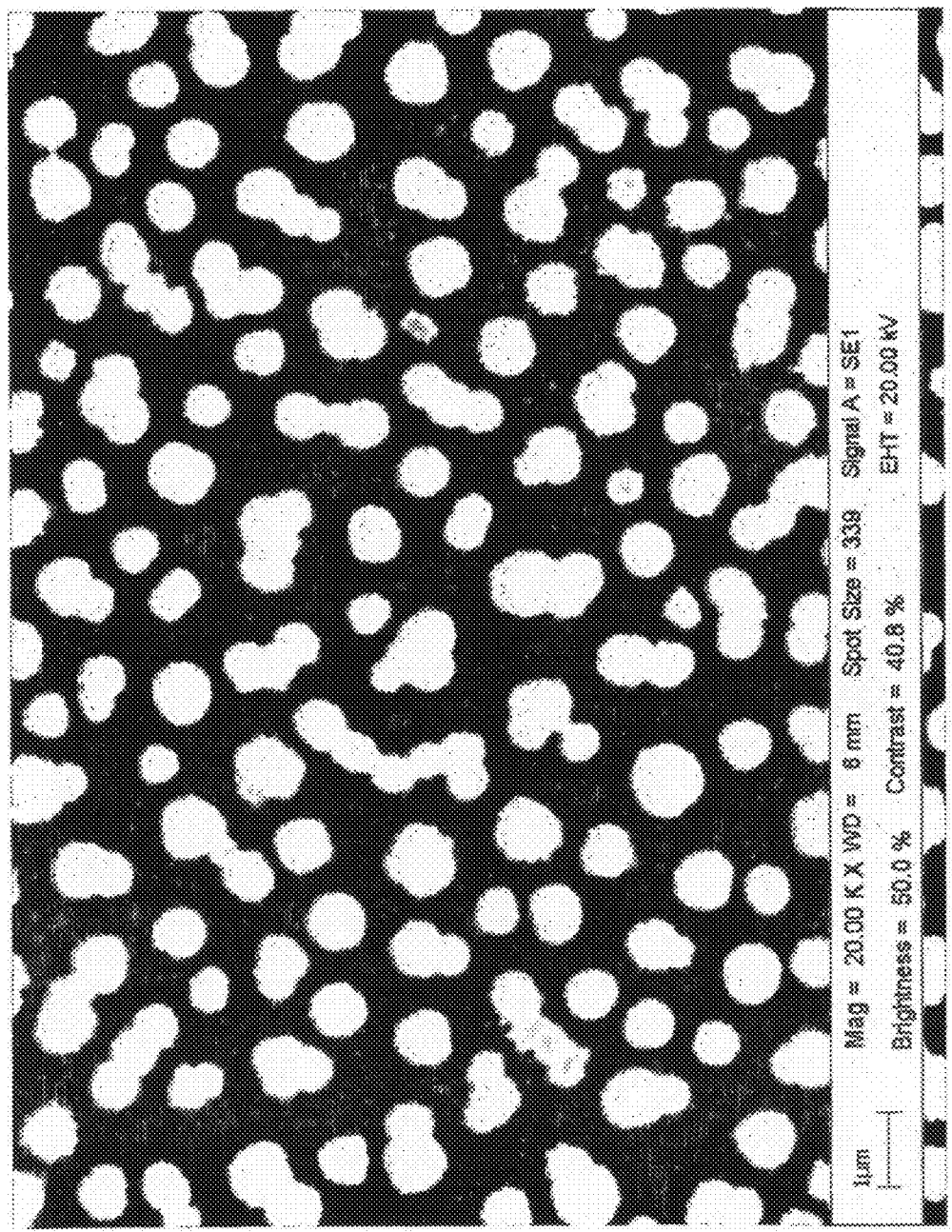
FIG. 4 shows pictures of the structure.

The model for ZPC decomposition is, in broad terms, the reverse of the above steps. Discharge of Li° at the electrolyte interface produces a surface vacancy in the ZPC. Locally Li° moves into the vacancy so the vacancy diffuses back to the ZPC/Si interface: at the interface Si$_n$ rejoins the Si phase (where it is said to be polycrystalline[13]) and vacancies coalesce to produce larger void spaces. These spaces, as they coalesce further and grow, give rise to the crack like features seen in the SEM pictures in FIGS. 4c,d and 5. Such a process has been described by Beaulieu et al[16] for lithium removal from silicon/tin alloys.

Figure 4:
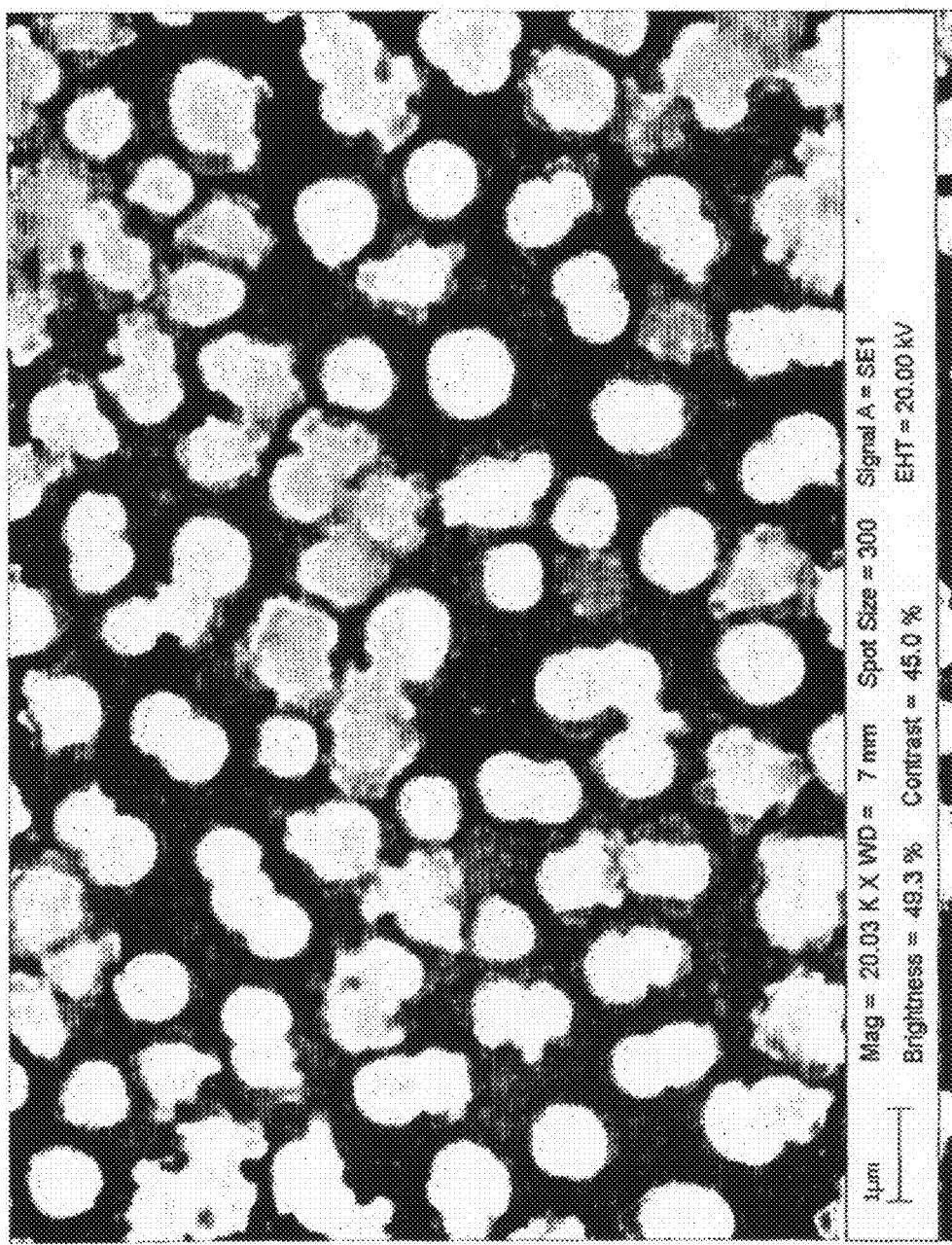
Figure 4:
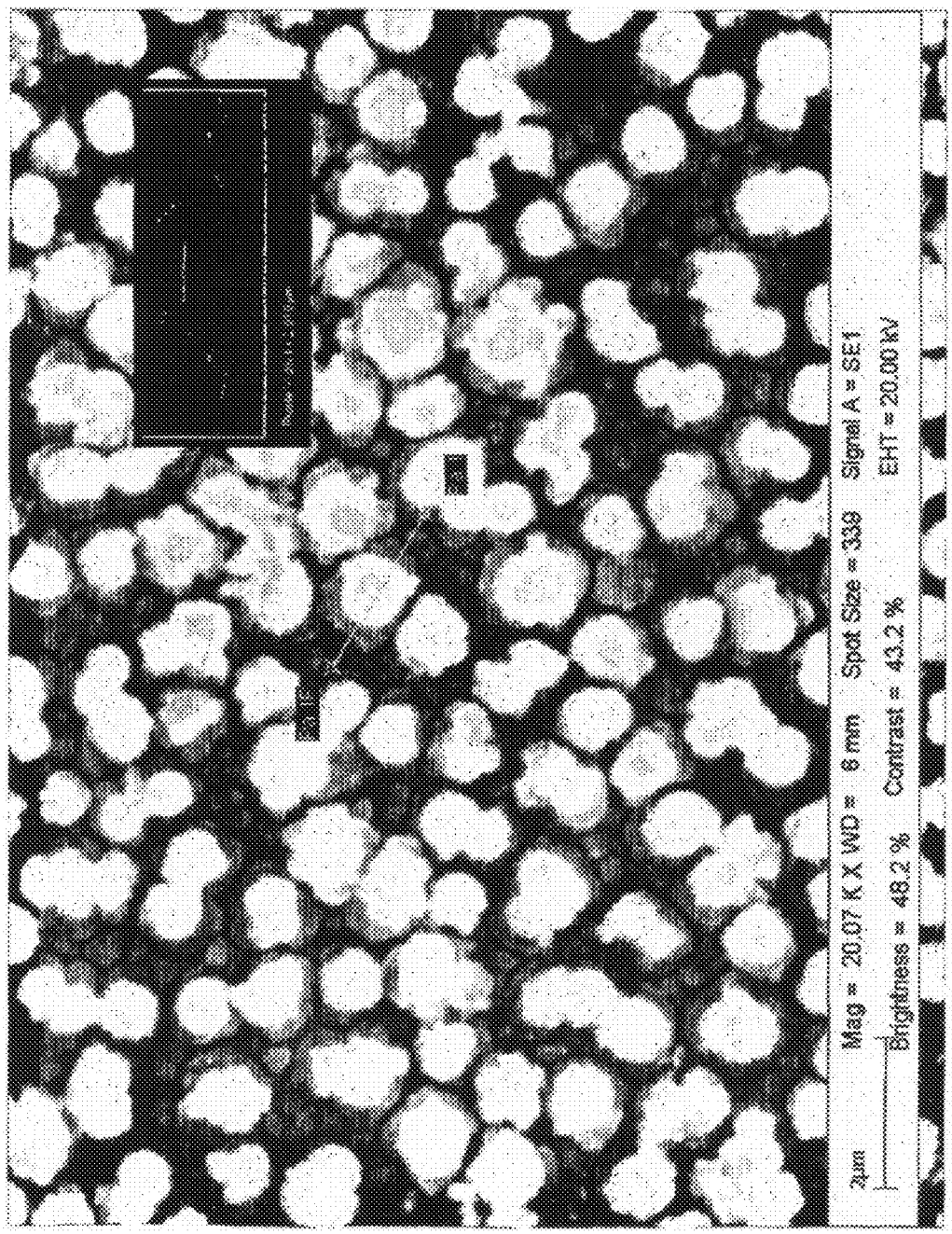
Figure 5:
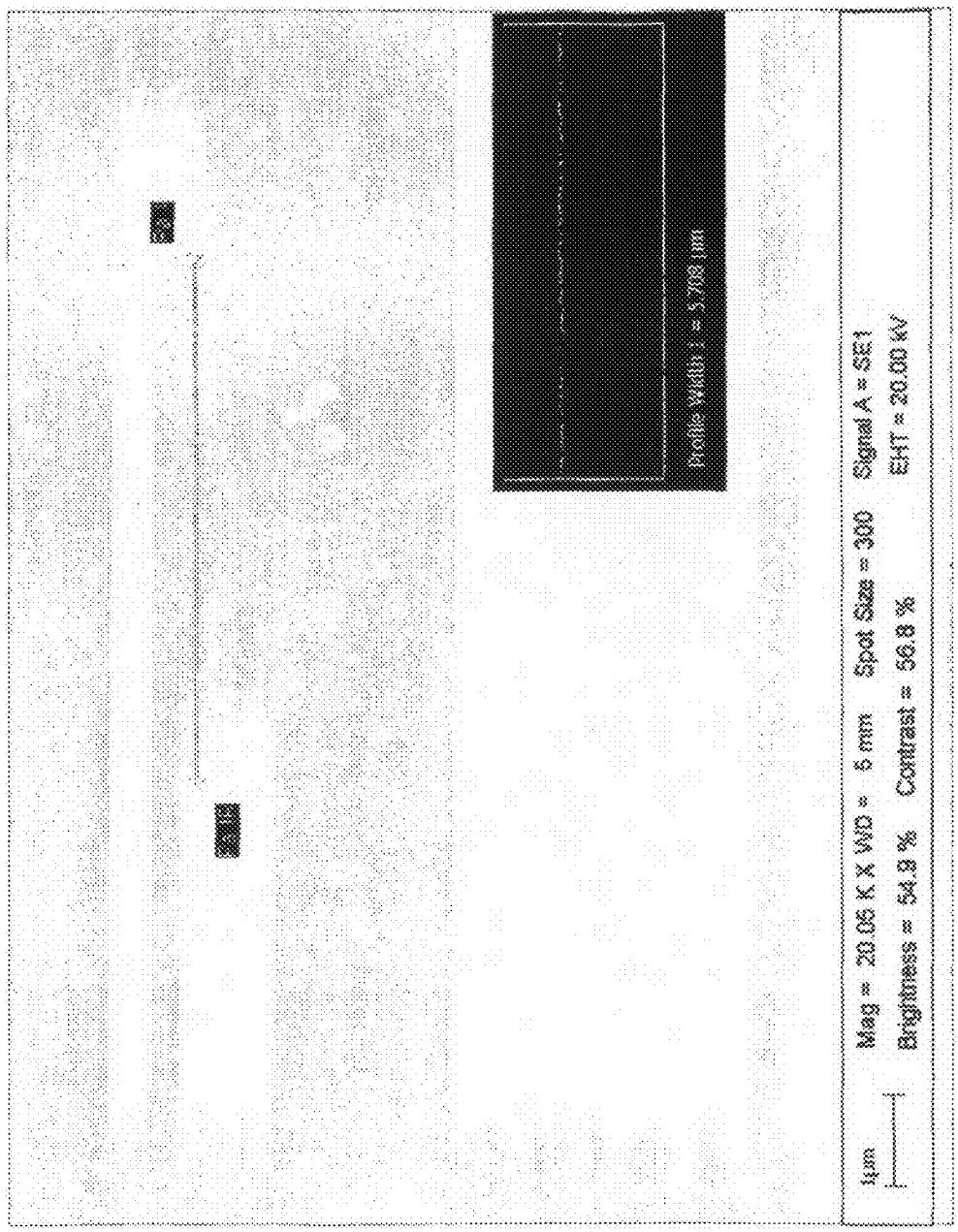
FIG. 5 shows SEM pictures of the structure.
Figure 5:
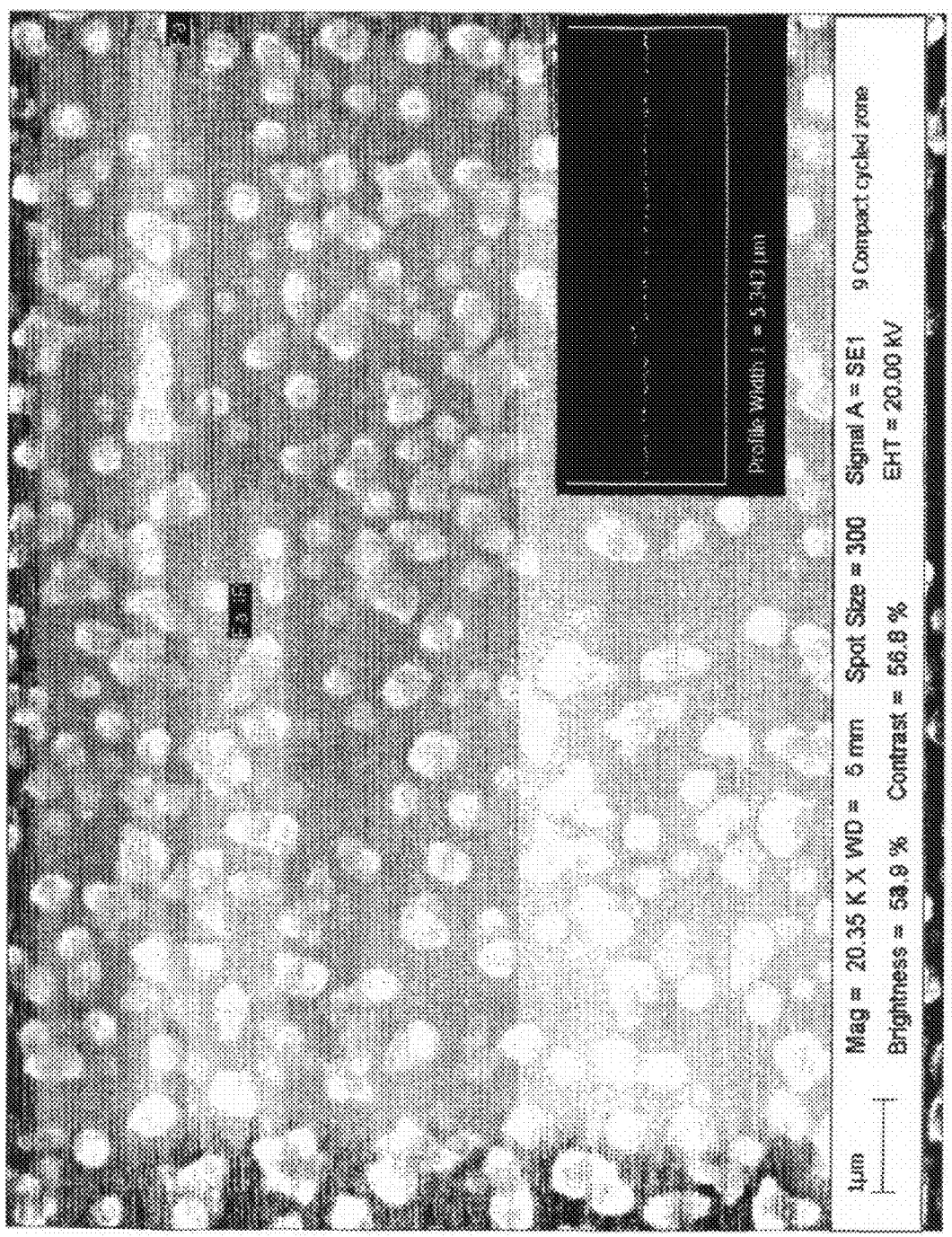
Figure 5:
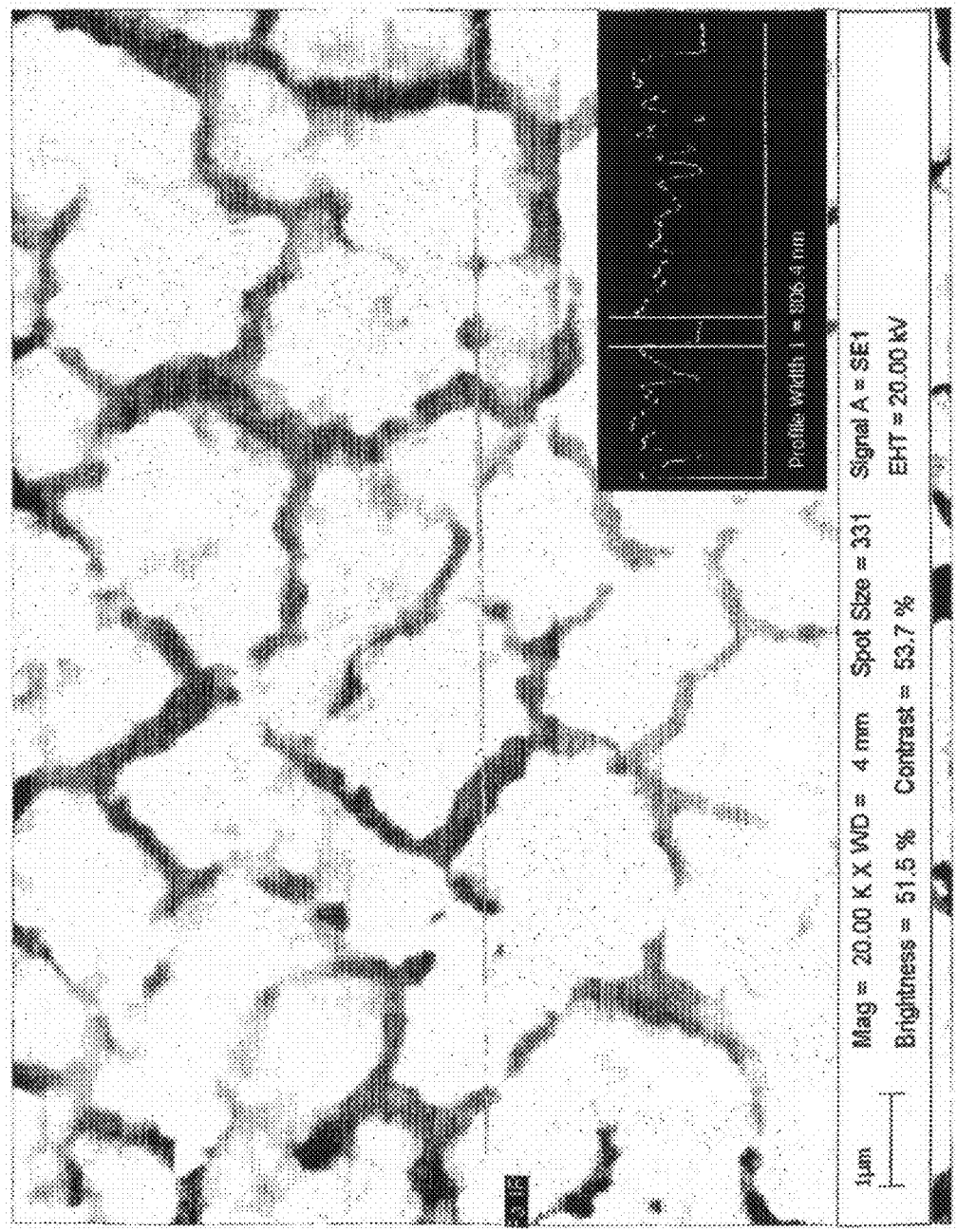

It has been shown that repeated Li alloying/de-alloying of planar Si can be carried out without pulverisation of the substrate, cf. FIG. 5. However, as noted, the alloy/de-alloy process is limited by diffusion through the ZPC layer. In order to obtain charging rates suitable for various applications it is necessary to increase the surface area of the Si/electrolyte interface; and this has been done using pillar fabrication. Previous attempts using silicon particles have failed because the particle-to-particle contacts change and part with cycling The pillar structures, on the other hand, are largely maintained as evidenced by the flatness of the pillar tops after 50 cycles, cf. FIG. 4.

Efficiencies of <100% reported here are attributed mainly to reaction, on alloying, with the electrolyte, and to a lesser extent isolation of regions of ZPC. The data presented here show that reduced current density on both alloying and de-alloying results in improving efficiency. It is supposed that this improvement comes mainly from a reduced surface concentration of adsorbed Li on alloying and accessing all the lithium in the ZPC on de-alloying.

There is large scope for further increasing the surface-to-volume ratio of the pillar construction, for example, pillars of diameter (d) ~0.3 microns and 6 micron height (H). The pillar volume (v) would be, FH, and for F=0.4, v=2.4×10$^{-4}$ cc/cm$^2$, which is equivalent, when converted to Li$_{12}$Si$_7$, to a capacity of 3.81×10$^3$ v=914 microAhrcm$^{-2}$. The surface area of such a pillar structure is ~4 FH/d, which is the basis of the much improved characteristics.

To make structures in accordance with the invention the following method may be used, namely "Island Lithography" as disclosed in international patent No. WO01/13414. This method employs cesium chloride as the resist in the lithographic step in the fabrication of pillar arrays. It works as follows. A thin film of CsCl is vacuum deposited on the clean, hydrophilic, surface of the Si substrate. This system is then exposed to the atmosphere at a controlled relative humidity. A multilayer of water adsorbes on the surface, the CsCl is soluble in the water layer (being more soluble at places of higher radius of curvature). The CsCl re-organises into a distribution of hemispherical islands, driven by the excess surface energy associated with CsCl surface curvature. Such arrays are useful in making structures for various studies involving nano-scale phenomena. In this case reactive ion etching is preferably used, with the islands acting as X masks so that removal of the surrounding silicon forms the desired pillar structures.

A study of the kinetics of the formation of island arrays has been carried out on GaAs surfaces[9] and more recently, and more extensively, on Si/SiO$_2$ surfaces[10] where the technique and results are described in detail. The process variables are: CsCl film thickness (L); humidity (RH), time of exposure (t). The resulting island array has a Gaussian distribution of diameters, average diameter (<d>) standard deviation (±s) and surface fractional coverage (F). Having made the CsCl resist array the next step is reactive ion etching (RIE) to produce the corresponding array of pillars[11]. The RIE process variables are: feed-gas composition, flow rate and chamber pressure; RF power; dc bias; etch time. The results are characterised by the etch depth, corresponding to pillar height (H), and the wall angle, namely the angle that the pillar wall makes with the wafer plane; it is chosen in this study to be close to 90°. The examples reported in this work were etched in a Oxford Plasmalab 80 apparatus. The etch gas was (O$_2$:Ar:CHF$_3$) in the ratio 1:10:20; feed rate 20 sccm; chamber pressure, 50 milli pascals; RF power, 73 watts; dc bias 200V.

The pillar structure reported in this study (K-series) was characterised as <d>=580 nm±15 nm; F=0.34; H=810 nm: it was made using, L=80 nm; RH=40%; t=17.5 hrs. After fabrication the silicon samples were washed in water; etched for 20 seconds in NH$_4$OH(28 w % NH$_3$):H$_2$O$_2$(100 v/v):H$_2$O in equal volume ratios; the etchant was flooded away with de-ionized water and blow dried.

Of course the structures may also be fabricated by other known techniques, such as photolithography, which produce regular arrays of features rather than the scattered distribution produced by island lithography.

Figure 1:
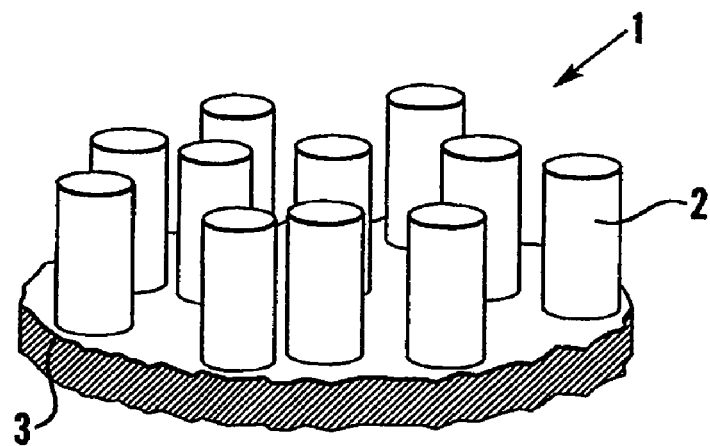
FIG. 1 is a schematic view of a structured electrode.

FIG. 1 is a schematic view of a structured electrode, in accordance with the invention and as used in the following tests, it shows a part sectional view of the anode in which the pillars 2 can clearly be seen on the silicon wafer 3.

Figure 6:
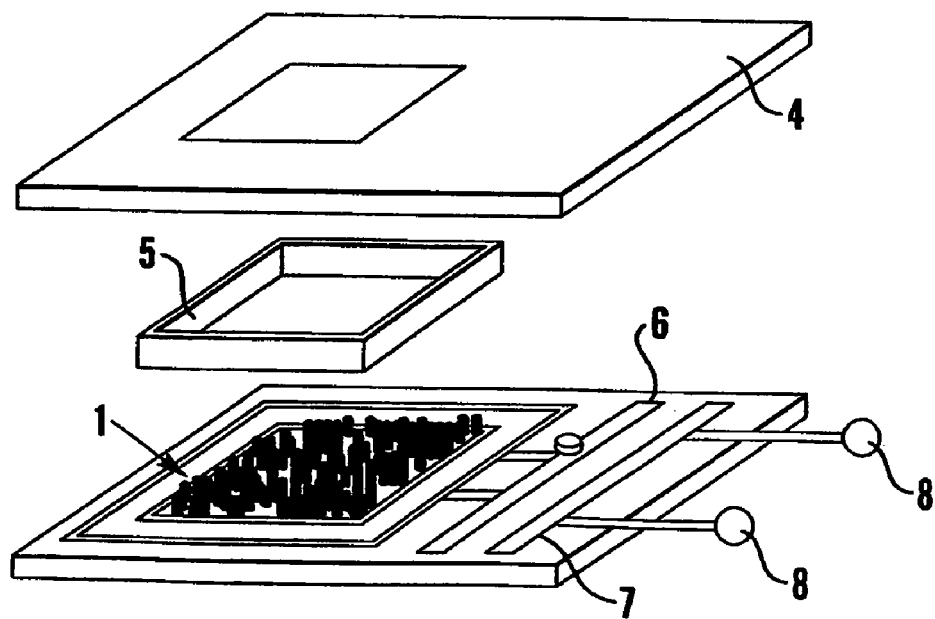
FIG. 6 shows a lithium battery in accordance with the present invention.
Figure 2A:
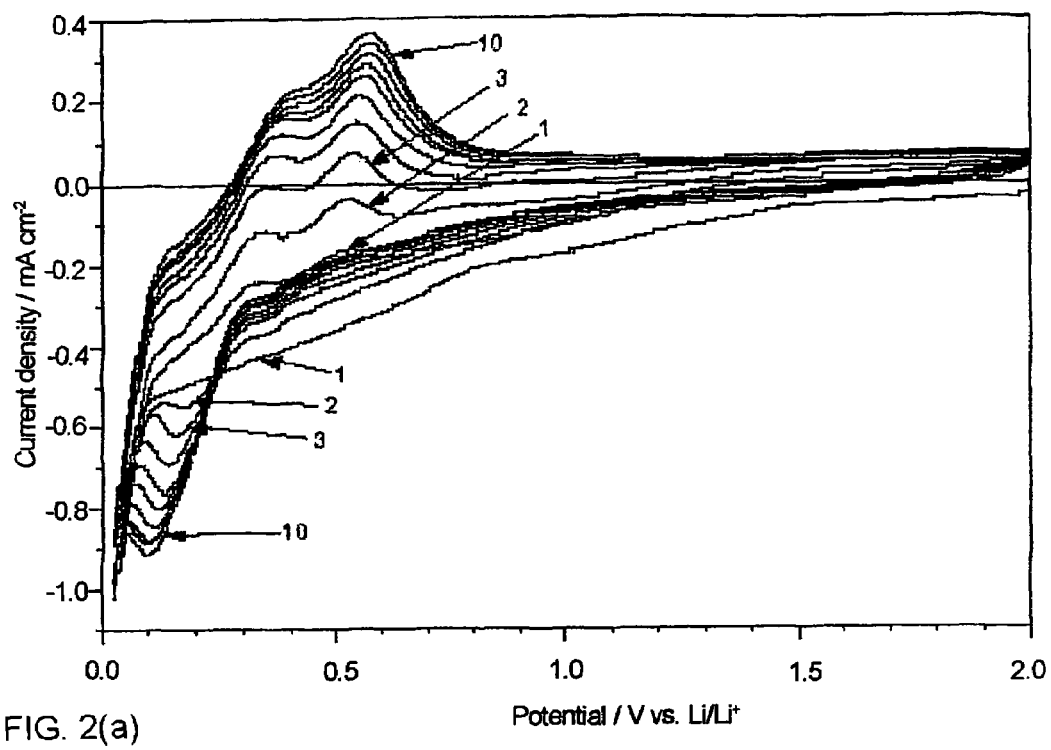
FIG. 2 shows one of a series of CV scan sets.
Figure 2B:
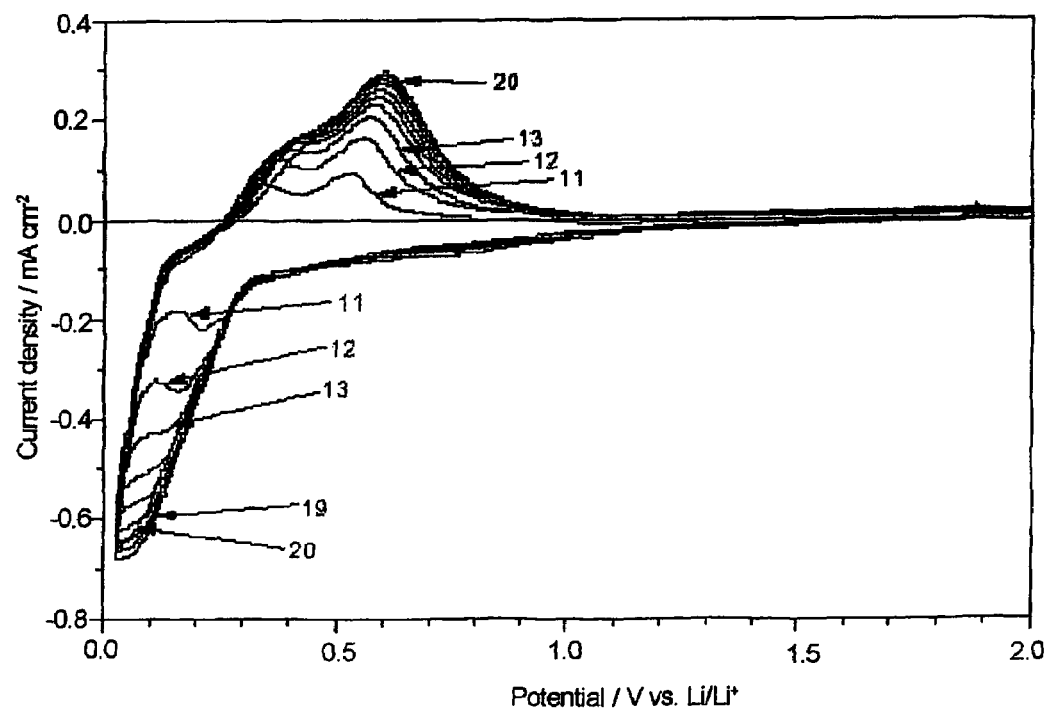
Figure 2C:
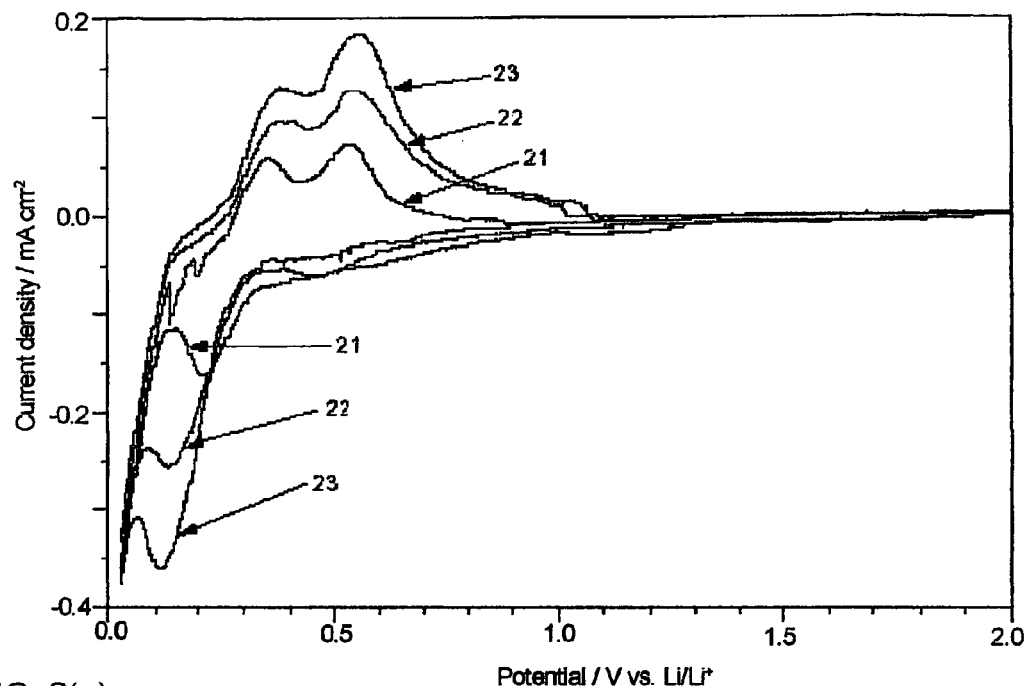
Figure 2D:
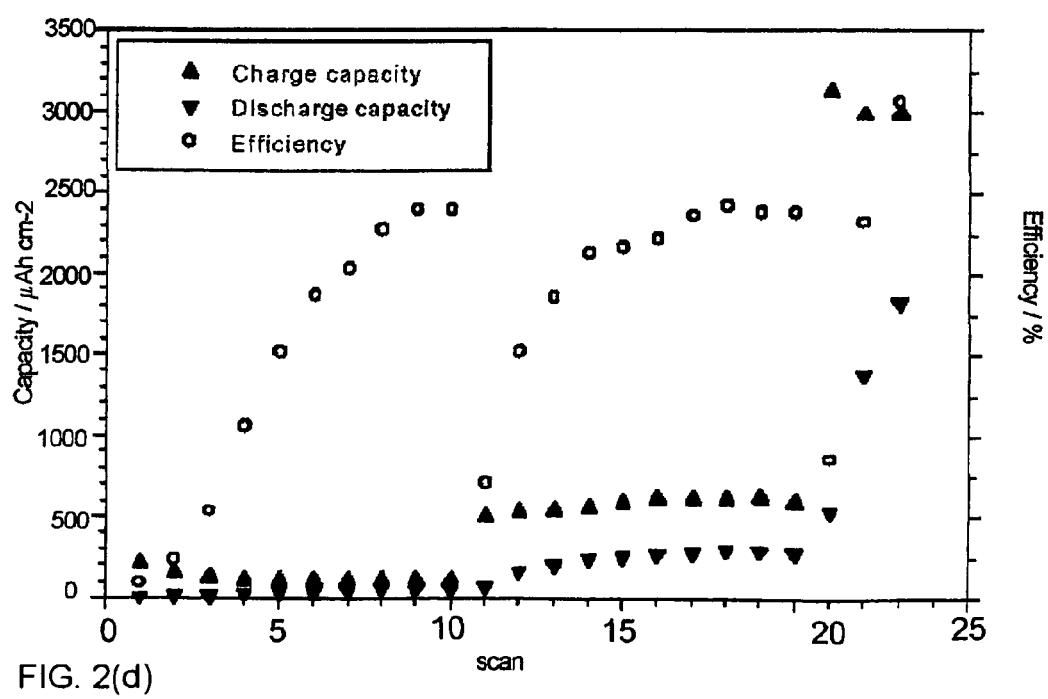
Figure 3A:
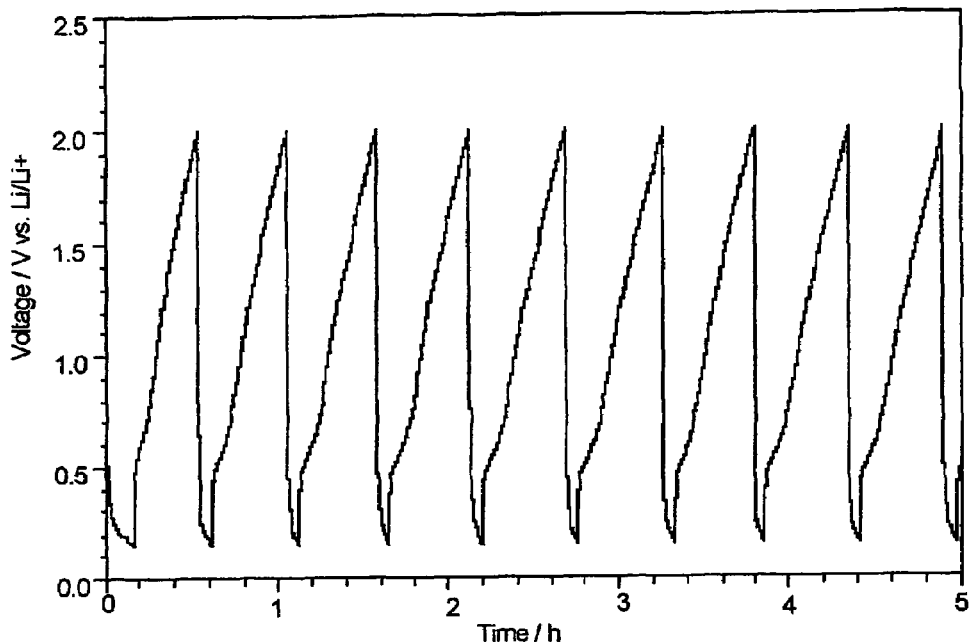
FIG. 3 shows results for a series of galvanostratic measurements.
Figure 3B:
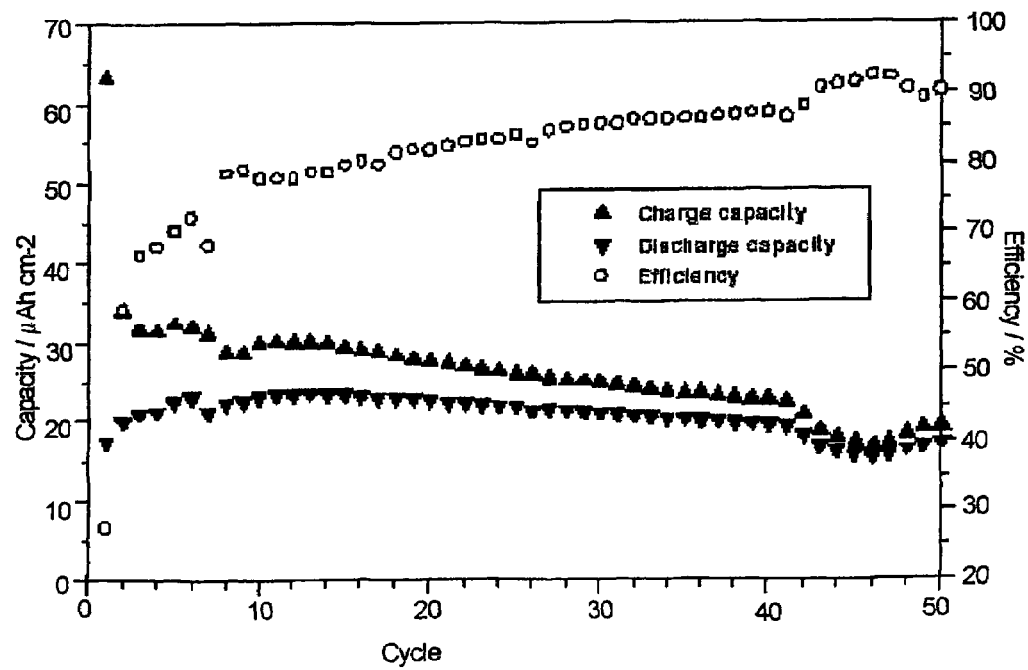
Figure 3C:
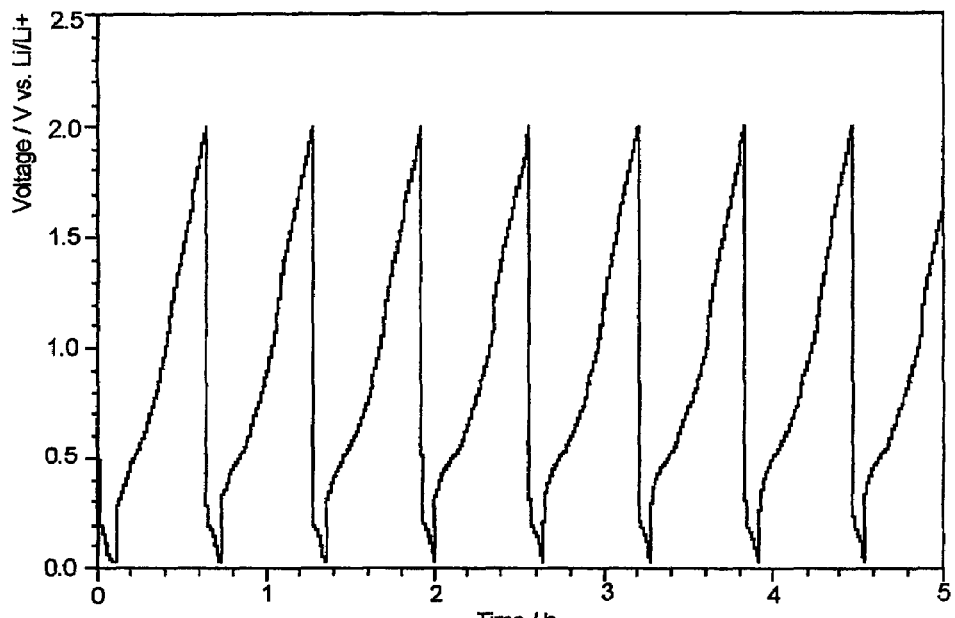
Figure 3D:
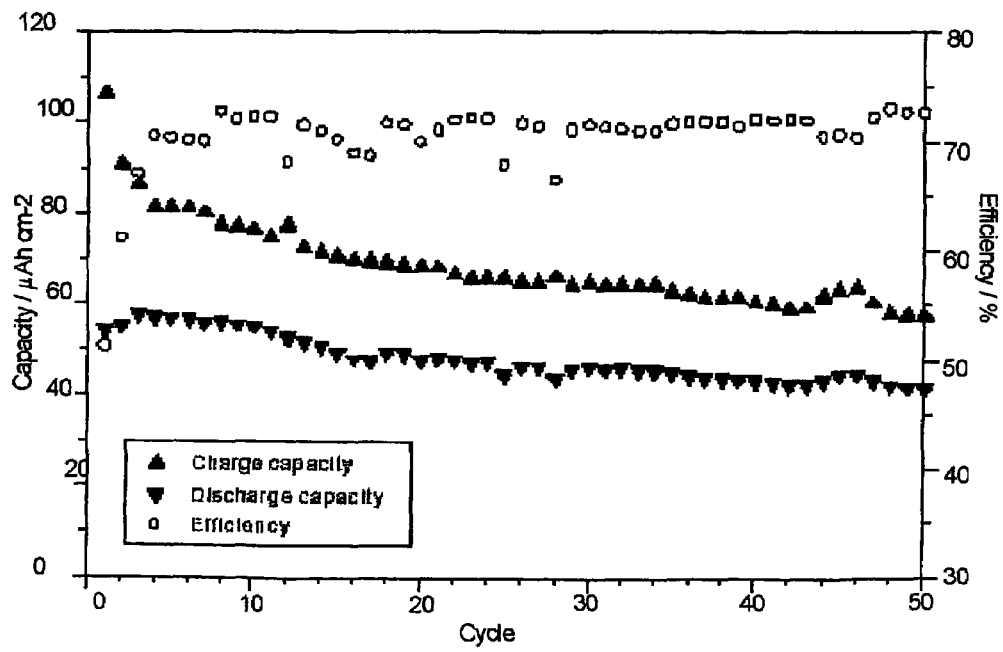

FIG. 6 shows a lithium battery, comprising a typical embodiment of the present invention, and including an anode 1, a cathode 4, a polymer electrolyte 5, a first strip 6 representing a rectifier circuit connected to a coil encircling the anode for charging purposes, a second strip 7 representing the output circuit (driven by the battery), and a pair of wires 8 for connection to the device to be driven.

Electrochemical tests were performed in a three-electrode, glass, cell where the Si sample is the working electrode and metallic Li is used for both the counter and reference electrodes. A 1 M solution of LiClO$_4$ (Merck Selectipurâ) in ethylene carbonate:diethyl carbonate (Merck Selectipurâ), (1:1) w/w solvent was used as the electrolyte. The cell was assembled under a dry argon atmosphere in a glove box. Ohmic contact was made to the rear side of the silicon samples electrodes using a 1:1 In—Ga eutectic alloy[12]. The electrode area was delineated using an O-ring configuration in a PTFE holder. No adhesive is used and a good electrolyte/atmosphere seal is obtained. In an earlier study we found that epoxy adhesive, used to mount a Si electrode, contaminated the active electrode surface causing spurious currents at high voltages (>2V).

Electrochemical behaviour of the cell was investigated by cyclic voltammetry (CV) and by galvanostatic measurement (voltage vs. time at constant current), using an electrochemical workstation (VMP PerkinElmer™ Instruments). The capacity referred to here is the total charge inserted into the projected electrode surface area exposed to the electrolyte (this ignores any surface area due to structuring), given as mAhcm$^{-2}$ (micro Amp hours cm$^{-2}$).

The results obtained were:

The response of the Li|Li$^+$-electrolyte|Si cell was measured: for this cell the cathodic process is, discharge of lithium onto silicon to form an alloy (charging), and the anodic process is lithium extraction or de-alloying (discharging). FIG. 2 shows one series of CV scan sets (details in caption). The first cycle, and to quite a large extent the second, differs from those that follow. It is conjectured that this difference is due to a "formation" effect, associated with the filming of the electrode during the first Li discharge. After the first and second cycles, the scans assume a repeatable general shape. Since these are scans in which the potential is changed slowly and the current densities are therefore small, there are no IR drop or diffusion overpotential terms, and assuming no activation overpotential, the electrode potential is a measure of the surface lithium activity. The first cathodic feature is the rapid increase in current at ~330 mV that, according to room temperature data[7], corresponds to the presence of Li$_{12}$Si$_7$. The lowest potential reached is 25 mV and this is taken to be associated with the presence of higher Li compounds, e.g. Li$_{21}$Si$_5$. The cycling sequence shows a progressive "activation" of the sample, associated with increasing breakdown of the crystalline silicon structure (see discussion). The anodic, part of the CV curve is associated with progressive de-lithiation of the electrode according to the various ZPC equilibrium potentials. For a scan rate of 1 mVs$^{-1}$ the capacity (260 mAhcm$^{-2}$) of the electrodes is roughly comparable to the pillar volume being converted to Li$_{12}$Si$_7$, while for the slower scan rates the capacity exceeds that of the pillar volume. The latter results point to the participation of the substrate in the alloying/de-alloying process.

FIG. 3 shows the results for a series of galvanostratic measurements on structured Si at two different charge/discharge current densities (details in caption).

FIG. 4 shows the structure of the K-series of silicon electrodes that were used in this study and the effects of extensive galvanostatic cycling upon that structure. The structure are clearly intact, but at the higher current density slight cracking of the bulk Si surface, below the pillars, is observed.

FIG. 5 shows the SEM pictures of the structures obtained on planar (un-pillared) Si electrodes before cycling and, separately, after galvanostatic cycling. When cycled at the lower current densities, the surface is deformed, though crack formation does not occur. Cycling at higher current densities produces wide cracks.

REFERENCES 1. (a): R. A. Sharma and R. N. Seefurth, J. Electrochem. Soc., 123,1763 (1976); (b): B. A. Boukamp, G. C. Lash and R. A. Huggins, J. Electrochem. Soc., 128, 725 (1981); (c): R. A. Huggins, Lithium Alloy Anodes in "Handbook of Battery Materials", J. O. Besenhard Ed, Wiley-VCH, Weinheim, 359(1999); (d): S. Bourderau, T. Brousse and D. M. Schleich, J. Power Sources, 233, 81 (1999); (e): O. Z. Zhuo, Bo Bao and S. Sinha, U.S. Pat. No. 6,334,939B1 Jan. 1, 2002: There are many other patents relating to the use of various host materials for Li anodes.
2. Hong Li, Xuejie Huang, Liquan Chen, Zhengang Wu and Yong Liang, Electrochem. Solid-State Lett., 2, 547 (1999).
3. J. O. Besenhard, J. Yang and M. Winter, J. Power Sources, 68, 87 (1997)
4. L. Y. Beaulieu, D. Larcher, R. A. Dunlap and J. R. Dahn, J. Electrochem. Soc., 147, 3206 (2000).
5. J. K. Niparko (Editor), "Cochlea Implants", Pub., Lippincott Williams and Wilkins, Philadelphia, (2000)
6. C. J. Wen and R. A. Huggins, J. Solid State Chem., 37, 271 (1981).
7. W. J. Weydanz, M. Wohlfahrt-Mehrens and R. A. Huggins, J. Power Sources 81-82,237 (1999).
8. J-P. Colinge, "Silicon-on-Insulator Technology: Materials to VLSI", Kluwer Acad. Pub, Boston, Chapter 2, (1991).
9. Mino Green, M. Garcia-Parajo, F. Khaleque and R Murray, Appl. Phys. Lett., 63, 264 (1993.)
10. Mino Green and Shin Tsuchiya, J. Vac. Sci. & Tech. B, 17, 2074 (1999).
11. Shin Tsuchiya, Mino Green and RRA Syms, Electrochem. Solid-State Lett, 3, 44 (2000).
12. L-C. Chen, M. Chen, T-H Tsaur, C Lien and C-C. Wan, Sensors and Actuators, A49, 115 (1995).
13. H. Li, X. Huang, L. Chen, G. Zhou, Z. Zhang, D. Yu, Y. J. Mo and N. Pei, Solid State Ionics, 135, 181 (2000).
14. "Properties of Silicon", Pub. INSPEC, The Institution of Electrical Engineers, London, (1988): p. 461 for solubility; p. 455 for diffusion data.
15. B. E. Deal and A. S. Grove, J. Appl. Phys., 36, 3770 (1965).
16. L. Y. Beaulieu, K. W. Eberman, R. L. Turner, L. J Krause and J. R. Dahn, *Electrochem. Solid-State Lett.,* 4, A137 (2001).

The invention claimed is:

1. An energy storage device comprising:
   an anode comprising an array of sub-micron silicon structures supported on a silicon substrate; and
   a cathode comprising lithium, arranged to form a battery.
2. A device according to claim 1 wherein the anode is arranged to tolerate the conditions occasioned by the volume changes caused by charging/discharging of the battery.
3. A device according to claim 1 wherein the anode is arranged to maintain structural integrity throughout the cycling of the battery.
4. A device according to claim 1 wherein the anode is arranged to withstand repeated volume expansion associated with alloying during use of the battery.
5. A device according to claim 1 wherein the array of sub-micron silicon structures comprise an array of sub-micron silicon pillars.
6. A device according to claim 5 wherein the pillars have a surface area of about 4 FH/d times the substrate area wherein F is the surface fractional coverage, H is the height of the pillar and d is the diameter of the pillar.
7. A device according to claim 5 in which the sub-micron pillars do not exceed a fractional coverage of 0.5 of the substrate.
8. A device according to claim 5 wherein the pillars are 0.1 to 1.0 microns in diameter and 1 to 10 microns in height.
9. A device according to claim 5 wherein the pillars are approximately 0.3 microns in diameter and 6 microns in height.
10. A device according to claim 1 in which the substrate comprises n-type silicon.
11. A device according to claim 1 made on a wafer-bonded silicon-on-insulator substrate.
12. A battery including a silicon anode comprising: an array of sub-micron silicon pillars fabricated on a silicon substrate; and a lithium cathode, wherein a compound film is formed on the silicon pillars in a charging step.
13. A battery according to claim 12 wherein the film is a Zintl-Phase Compound.
14. A battery according to claim 12 wherein the compound film is deformable so as not to give rise to significant stress-induced cracking during the volume change in a charging or discharging step.
15. An electrode for a battery comprising sub-micron silicon pillars supported on a silicon substrate and arranged to form a battery with a lithium cathode and a lithium-based electrolyte.

* * * * *